United States Patent
Gao

(10) Patent No.: US 10,148,186 B2
(45) Date of Patent: Dec. 4, 2018

(54) SWITCHING POWER CONVERTER WITH EFFICIENT VCC CHARGING

(71) Applicant: Dialog Semiconductor Inc., Campbell, CA (US)

(72) Inventor: Xiaolin Gao, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/097,213

(22) Filed: Apr. 12, 2016

(65) Prior Publication Data

US 2017/0294841 A1    Oct. 12, 2017

(51) Int. Cl.
| | |
|---|---|
| *H02M 3/335* | (2006.01) |
| *H02M 1/08* | (2006.01) |
| *H05B 33/08* | (2006.01) |
| *H02M 3/158* | (2006.01) |
| *H02M 1/00* | (2006.01) |

(52) U.S. Cl.
CPC ......... *H02M 3/33507* (2013.01); *H02M 1/08* (2013.01); *H02M 3/158* (2013.01); *H02M 3/335* (2013.01); *H05B 33/0815* (2013.01); *H02M 2001/0006* (2013.01); *H02M 2001/0009* (2013.01)

(58) Field of Classification Search
CPC ........... H02M 3/1563; H02M 3/33507; H02M 3/33523; H02M 3/33576; H02M 3/33592; H02M 1/32; H02M 2001/0032; H02M 2001/4208; H02M 7/155; H02M 7/217; H02M 7/1555; H02M 7/1557; H02M 1/08; H02M 2001/0006; H02M 2001/0009; Y02B 70/126; Y02B 70/1475; H05B 33/0815
USPC ................................ 363/12.12, 21.14–21.17
See application file for complete search history.

(56) References Cited

U.S. PATENT DOCUMENTS

| | | | | |
|---|---|---|---|---|
| 6,674,271 | B2 * | 1/2004 | Choo ................ | H02M 3/33561 323/282 |
| 8,873,255 | B2 * | 10/2014 | Chou ..................... | H02M 1/32 363/49 |
| 8,933,675 | B2 * | 1/2015 | Gao ........................ | G05F 1/613 323/266 |
| 2002/0125867 | A1 * | 9/2002 | Choo ................ | H02M 3/33561 323/282 |
| 2007/0159863 | A1 * | 7/2007 | Lu ..................... | H02M 3/33592 363/84 |
| 2007/0280314 | A1 * | 12/2007 | Keh ..................... | H01S 5/06808 372/38.02 |
| 2011/0157941 | A1 * | 6/2011 | Yedevelly ......... | H02M 3/33507 363/126 |
| 2013/0134985 | A1 * | 5/2013 | Bernardon ......... | G01R 31/2853 324/527 |
| 2013/0294120 | A1 * | 11/2013 | Nomura .................. | H02M 1/36 363/49 |
| 2014/0022829 | A1 * | 1/2014 | Shi ...................... | H02M 1/4258 363/84 |
| 2015/0019882 | A1 * | 1/2015 | Irish ........................ | G06F 1/26 713/300 |

* cited by examiner

*Primary Examiner* — Yemane Mehari

(74) *Attorney, Agent, or Firm* — Haynes and Boone, LLP

(57) ABSTRACT

A switching power converter controller is provided that includes a VCC charging switch transistor coupled between a drain of a power switch transistor and a storage capacitor.

13 Claims, 6 Drawing Sheets

SWITCHING POWER CONVERTER WITH EFFICIENT VCC CHARGING

TECHNICAL FIELD

This application relates to switching power converters, and more particularly to the regulation of a power supply voltage for a switching power converter.

BACKGROUND

Due to their advantageous low power consumption and lack of toxic materials, solid state light emitting diode (LED) lighting applications are rapidly replacing conventional incandescent and florescent lighting systems. However, an LED cannot be exposed to the AC mains like an incandescent bulb. Solid state lighting applications thus include a switching power converter to convert the AC input current into a rectified DC output current that may power the LED. A controller controls a power switch in the switching power converter so that the desired current powers the LED. The controller needs its own power supply voltage, which is designated herein as VCC. The generation of VCC for the controller must balance cost and efficiency. The need for efficient generation of VCC also applies to other types of switching power supplies such as an AC-DC adapter and charger.

The generation of VCC depends upon the switching power converter architecture. For example, the power switch in a flyback power couples to a primary winding of a transformer. An auxiliary winding on the transformer thus provides a convenient and very efficient way to generate VCC. But transformers add to manufacturing costs so it is less expensive to use non-isolated switching regulator architectures such as a buck or a buck-boost switching power converter to power LEDs. In a non-isolated switching regulator, the power switch couples to an inductor. Although the simplicity of an inductor as opposed to a transformer lowers costs for non-isolated switching regulators, the efficient generation of VCC at a suitably low cost becomes more challenging. For example, a "source-switching" VCC charging architecture may be used in non-isolated switching power converters in which the power switch transistor comprises an NMOS power switch transistor having its drain coupled to the inductor and its source coupled to a source voltage terminal of the controller. The gate of the NMOS power switch transistor is driven by a relatively constant voltage derived from the rectified input voltage. The controller includes a first control switch for controlling whether the source voltage terminal is grounded. If the source voltage terminal is grounded through the first control switch, the NMOS power switch transistor switches on for a power cycle. Should the first control switch turn off the source voltage terminal floats to a sufficiently high voltage such that the NMOS power switch transistor switches off. The "source-switching" designation of the architecture is thus provided the selective coupling of the source for the NMOS power switch to ground through the first control switch.

To generate VCC, the controller in a source-switching architecture includes another second control switch coupled between the source voltage terminal and a VCC terminal. When the second control switch switches on, a storage capacitor coupled to the VCC terminal is charged. The controller regulates the cycling of the second control switch to regulate VCC. Although the second control switch regulation works efficiently for relatively low power LEDs, its efficiency drops for higher-power systems such as an output power of 20 W or greater. In particular, the drain-to-source on-resistance ($R_{dson}$) for the first control switch becomes problematic as the first control switch is in the main conduction path for the inductor. Note that the first power switch is incorporated into the controller die. As the inductor current is increased to produce higher output powers, the power losses from $R_{dson}$ becomes problematic for a relatively small transistor size for the first control switch. The solution for high-power source-switching is thus to increase the die space for the first control switch or replace it with an external transistor, which increases manufacturing cost.

Current alternatives to source-switching architectures also suffer from high costs or low efficiency with regard to generating VCC. For example, an external capacitor may be coupled between the drain terminal on the controller that couples to a drain of the power switch transistor and another suitable controller terminal such as an AC supply terminal. As the drain voltage toggles from high to low in each power switch cycle, the external capacitor is charged to provide a VCC source. Although such generation is very simple, its efficiency is poor as most of the charging energy is lost.

Accordingly, there is a need in the art for non-isolated switching power converters with efficient VCC generation.

SUMMARY

A switching power converter controller is provided that is configured to control a cycling of a power switch transistor to regulate an output power provided to a load. The controller includes a drain terminal for coupling to a drain of the power switch transistor and a capacitor terminal for coupling to an anode of a controller power supply voltage (VCC) capacitor. The controller also includes a VCC charging switch transistor that couples between the drain terminal and the capacitor terminal.

The controller controls the VCC charging switch transistor to cycle on for an initial period of each switching cycle for the power switch transistor. When the VCC charging switch transistor cycles on, a VCC charging current flows through the VCC charging switch transistor to charge the VCC capacitor. By modulating the on-time for the VCC charging switch transistor in each switching cycle for the power switch transistor, the controller modulates VCC as stored across the VCC capacitor. Regardless of whether the switching power converter is isolated or non-isolated, the resulting modulation of the controller power supply voltage (VCC) is quite efficient. For example, in an isolated switching power converter such as a flyback converter, the drain of the power switch transistor couples to a primary winding in a transformer. Similarly, the drain of the power switch transistor in a non-isolated switching power converter such as a buck or a boost converter couples to an inductor. The inductive load of the primary winding in a flyback converter or the inductor in an isolated switching power converter is ideally lossless in each switching cycle of the VCC charging switch transistor. The regulation of the power supply voltage VCC for the controller is thus very efficient. These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The efficient VCC charging discussed herein for the regulation of the controller power supply voltage VCC may be practiced in both non-isolated and isolated switching power converters. As used herein, a "non-isolated" switching power converter is deemed to be a power converter in which the ground for an input power source is shared with the ground for the load. In contrast, an "isolated" switching power converter is deemed herein to be a power converter in which the ground for the input power source is not shared with the ground for the load. A non-isolated switching power converter embodiment will be discussed first followed by a discussion of an isolated switching power converter embodiment.

Figure 1:
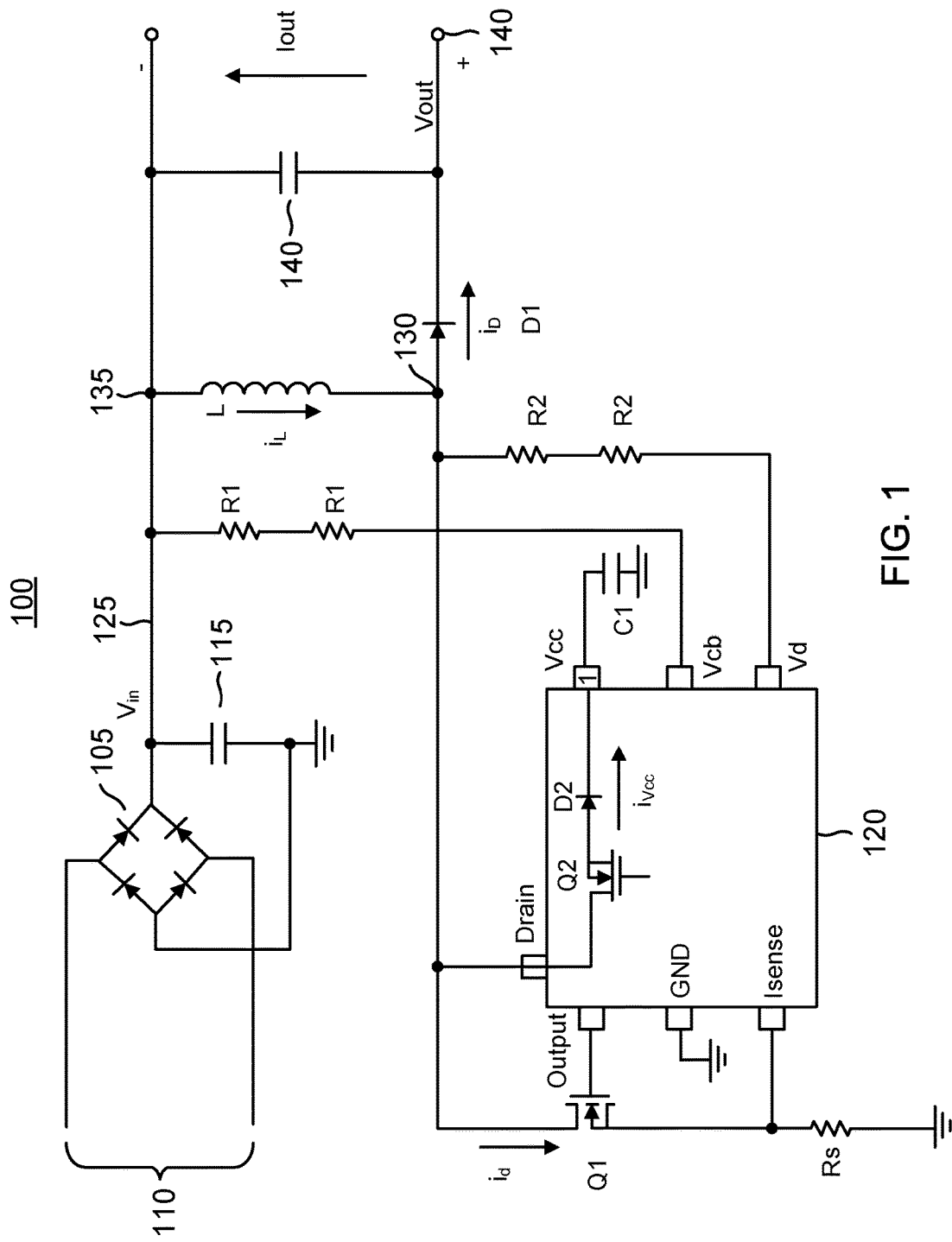
FIG. 1 is a circuit diagram of a non-isolated switching power converter configured for efficient VCC charging in accordance with an aspect of the disclosure.

Turning now to the drawings, an example non-isolated switching power converter 100 configured to practice the efficient VCC charging discussed herein is shown in FIG. 1. A diode bridge 105 rectifies an AC input voltage from an AC mains 110 to produce a rectified input voltage Vin stored across an input capacitor 115 at an input node 125. A controller 120 monitors the rectified input voltage stored across input capacitor 115 through an input capacitor voltage terminal Vcb that receives the rectified input voltage Vin through one or more resistors R1 coupled between input capacitor voltage terminal Vcb and input node 125. A power switch transistor Q1 such as an NMOS transistor has its drain coupled to a drain terminal for controller 120 and has its gate coupled to an output terminal of controller 120. The source for power switch transistor Q1 couples to ground through a sense resistor Rs.

The drain of power switch transistor Q1 couples to a terminal 130 of an inductor L that has another terminal 135 coupled to input node 125. When controller 120 drives the voltage of its output terminal sufficiently high, power switch transistor Q1 cycles on such that an inductor current $i_L$ flows through the inductor L. Terminal 130 of inductor L couples to an output voltage node 140 through a diode D1. Diode D1 is reverse biased when power switch transistor Q1 switches on such that the inductor current $i_L$ flows through power switch transistor Q1 as a drain current $i_d$. Controller 120 monitors the drain current $i_d$ in each power switch cycle through an Isense terminal coupled to the source of power switch transistor Q1. Similarly, controller 120 monitors the drain voltage (Vd) for the power switch transistor Q1 through a Vd terminal that couples to the drain of power switch transistor Q1 through one or more resistors R2.

When controller 120 discharges the voltage of its output terminal, power switch transistor Q1 shuts off such that its drain voltage Vd rises. Diode D1 then becomes forward biased such that the magnetic energy stored in inductor L from the on-time for power switch transistor Q1 in the power switch cycle is delivered to a load (not illustrated) and to an output capacitor 140 as a diode current $i_D$. By controlling the cycling of power switch transistor Q1, controller 120 can thus regulate an output current Iout delivered to the load. The load is coupled between output node 140 and input node 125.

Controller 120 includes a VCC charging switch transistor Q2 having a first terminal coupled to the drain terminal of controller 120 and a second terminal coupled to an anode of a charging diode D2 having a cathode coupled to a VCC terminal. A VCC storage capacitor C1 couples between ground and the VCC terminal. Charging diode D2 thus forms a current path if a channel is formed between the first and second terminals of VCC charging switch transistor Q2. The following discussion will assume that VCC charging switch transistor Q2 is an n-channel depletion-mode field effect transistor (DFET). A DFET is advantageous in that when controller 120 is initially turned on, VCC has not yet been developed across VCC storage capacitor C1 A positive VCC is required to bias the gate of an NMOS transistor such that controller 120 would need a bootstrap circuit (not illustrated) to initially charge the gate of an NMOS VCC charging switch transistor Q2. In contrast, a DFET VCC charging switch transistor Q2 needs no such bootstrapping as it will be on at startup of controller 120. DFET VCC charging switch transistor Q2 will thus conduct current at startup of controller 120 such that diode D2 becomes forward biased and VCC can build across VCC storage capacitor C1. Controller 120 may then boot up through a power-on reset procedure once VCC has reached an operating level such that normal operation may ensue.

Figure 2:
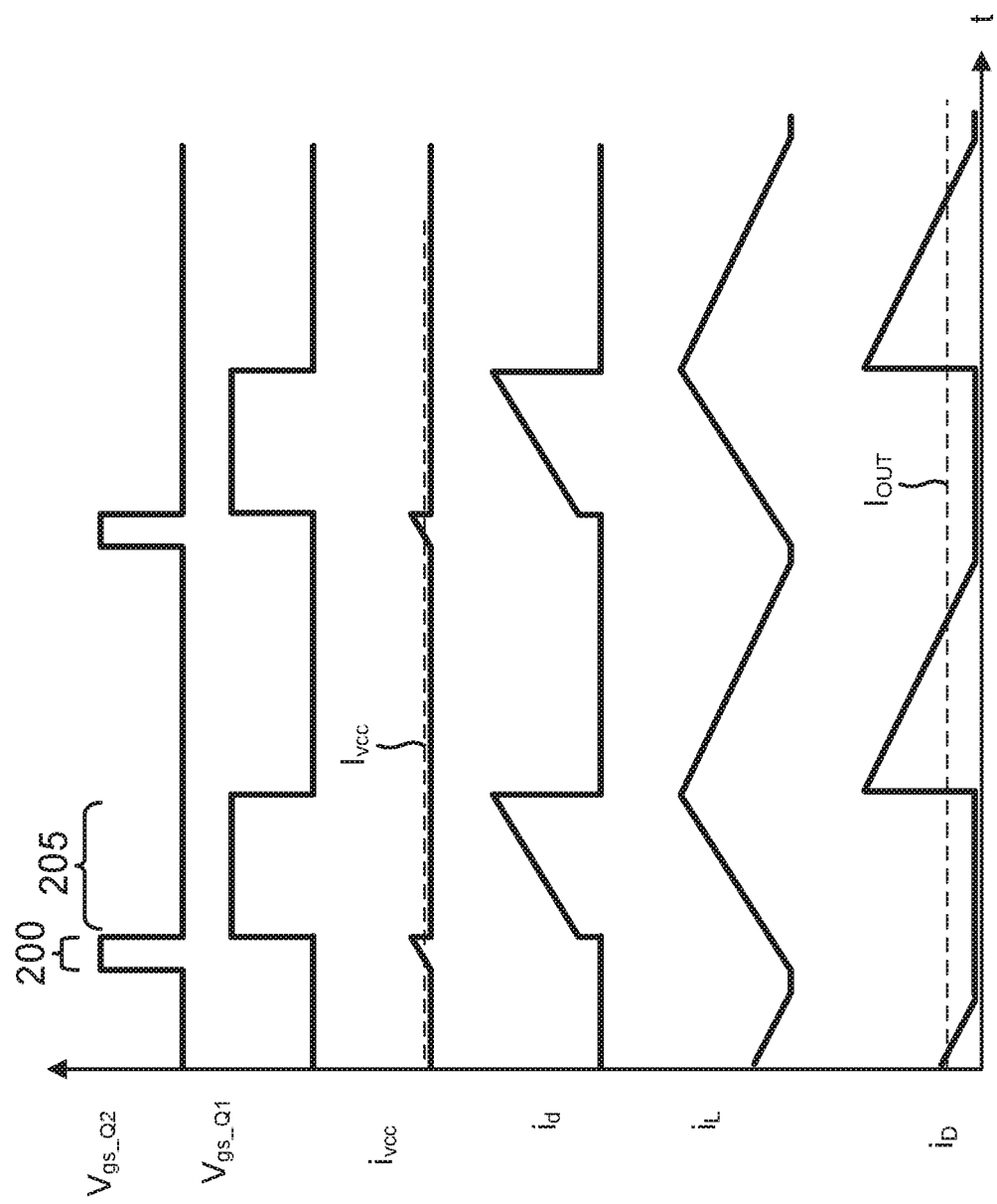
FIG. 2 is a diagram of voltage and current waveforms for the switching power converter of FIG. 1.

During normal operation, controller 120 modulates the on-time for VCC charging switch transistor Q2 in each cycle of power switch transistor Q1 to maintain the desired level for VCC. Note that the resulting generation of VCC is quite efficient since the conduction loss through inductor L is relatively insignificant. When VCC charging switch transistor Q2 cycles on, a charging current iVCC flows through charging diode D2 to charge VCC capacitor. As shown in FIG. 2, the pulsing of the gate voltage by controller 120 causes the gate-to-source voltage (Vgs_Q2) for the VCC charging switch transistor Q2 to pulse, which in turn causes the charging current $i_{VCC}$ to ramp up approximately at a slew rate of Vin/L (neglecting VCC voltage), where Vin is the rectified input voltage across input capacitor 115 (FIG. 1) and L is the inductance of inductor L. When the gate-to-source voltage Vgs_Q2 is pulsed off; the charging current $i_{VCC}$ drops to zero. From the law of conservation of charge, it may be seen that a DC average (IVCC) of the charging current $i_{VCC}$ equals the operating current for controller 120.

In each power switch cycle, controller 120 pulses the gate voltage of power switch transistor Q1, which causes its gate-to-source voltage Vgs_Q1 to pulse. While Vgs_Q1 is pulsed, the drain current $i_d$ entering the drain of power switch transistor Q1 to increase approximately at the Vin/L slew rate. When controller 120 discharges the gate voltage for power switch transistor Q1, drain current $i_d$ drops to zero. The increases in $i_{VCC}$ and $i_d$ are mirrored by corresponding increases in an inductor current $i_L$ through inductor L that reaches its peak in each power switch cycle when power switch transistor Q1 cycles off. The inductor current $i_L$ then ramps down to zero as power is delivered to the load. In each power switch cycle, a diode current ($i_D$) through diode D1 rises to a peak from zero when the power switch transistor Q1 is cycled off. A DC average $I_{OUT}$ of the output current driven through the load equals a DC average of the diode current $i_D$.

Each power switch cycle begins with a VCC charging period 200 in which Vgs_Q2 is pulsed to charge VCC. In one embodiment, Vgs_Q1 in each power switch cycle is not turned on for a period 205 until period 200 has ended. In an alternative embodiment, period 205 may start prior to the end of period 200 such that there is a relatively small overlap between the cycling on of VCC charging transistor Q2 and power switch transistor Q1. Such an overlap prevents the open circuiting of inductor current $i_L$ so as to prevent any voltage spikes across the inductor and resultant stress upon VCC charging transistor Q2 and power switch transistor Q1.

Figure 3:
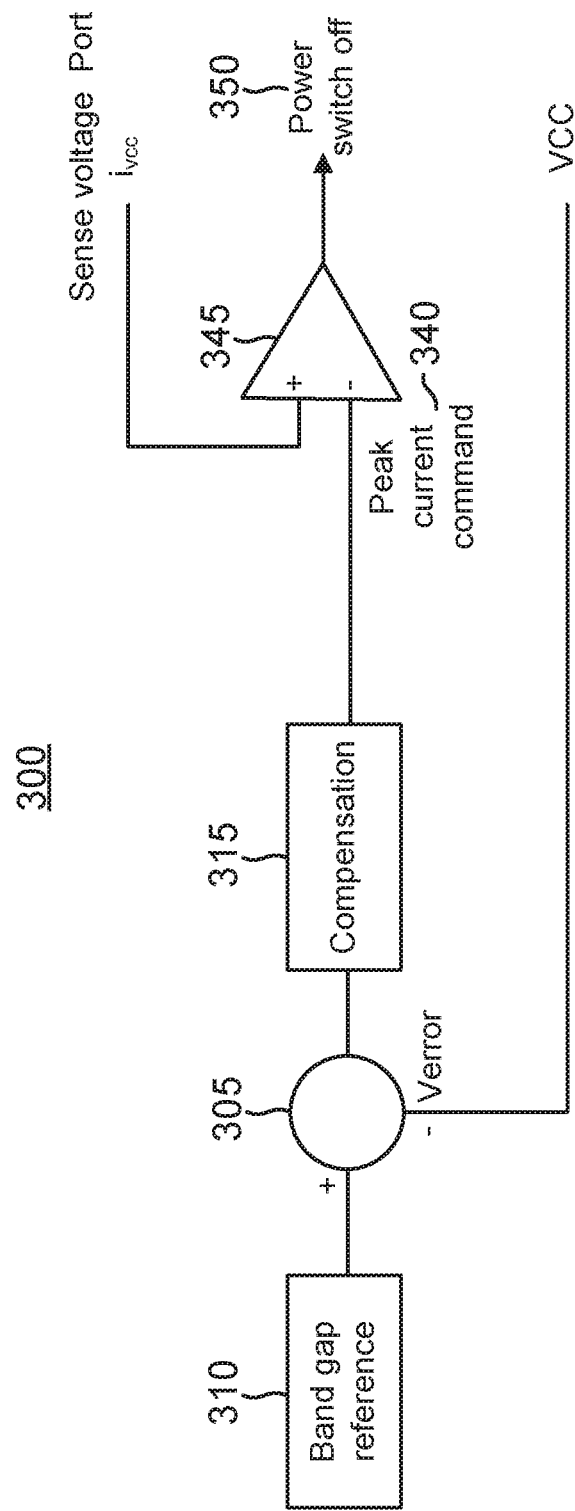
FIG. 3 is a block diagram of a feedback control circuit for controlling the cycling of a VCC charging switch transistor according to a peak current command.

A feedback circuit 300 shown in FIG. 3 is configured to modulate the cycling of VCC charging switch transistor Q2 using a constant peak current control methodology. A differential amplifier 305 generates an error voltage Verror by comparing the controller power supply voltage VCC to a stable reference signal such as derived from a band gap reference circuit 310. A compensation filter 315 filters the error voltage Verror to produce a compensated error voltage that functions as a peak current command 340. A comparator 345 compares the value for charging current $i_{vcc}$ to peak current command 340 to switch off VCC charging switch transistor Q2 when the desired peak current has been reached. Note that when the input voltage is close to zero, the on-time of VCC charging switch transistor Q2 is large due to the resulting small Vin/L slew rate. Therefore the VCC charging switch transistor Q2 is turned off according to a maximum on-time limit before hitting peak current command 340. Referring again to FIG. 1, a sense resistor (not illustrated) may be inserted into the VCC charging current path to obtain the charging current value compared at comparator 345.

Figure 4:
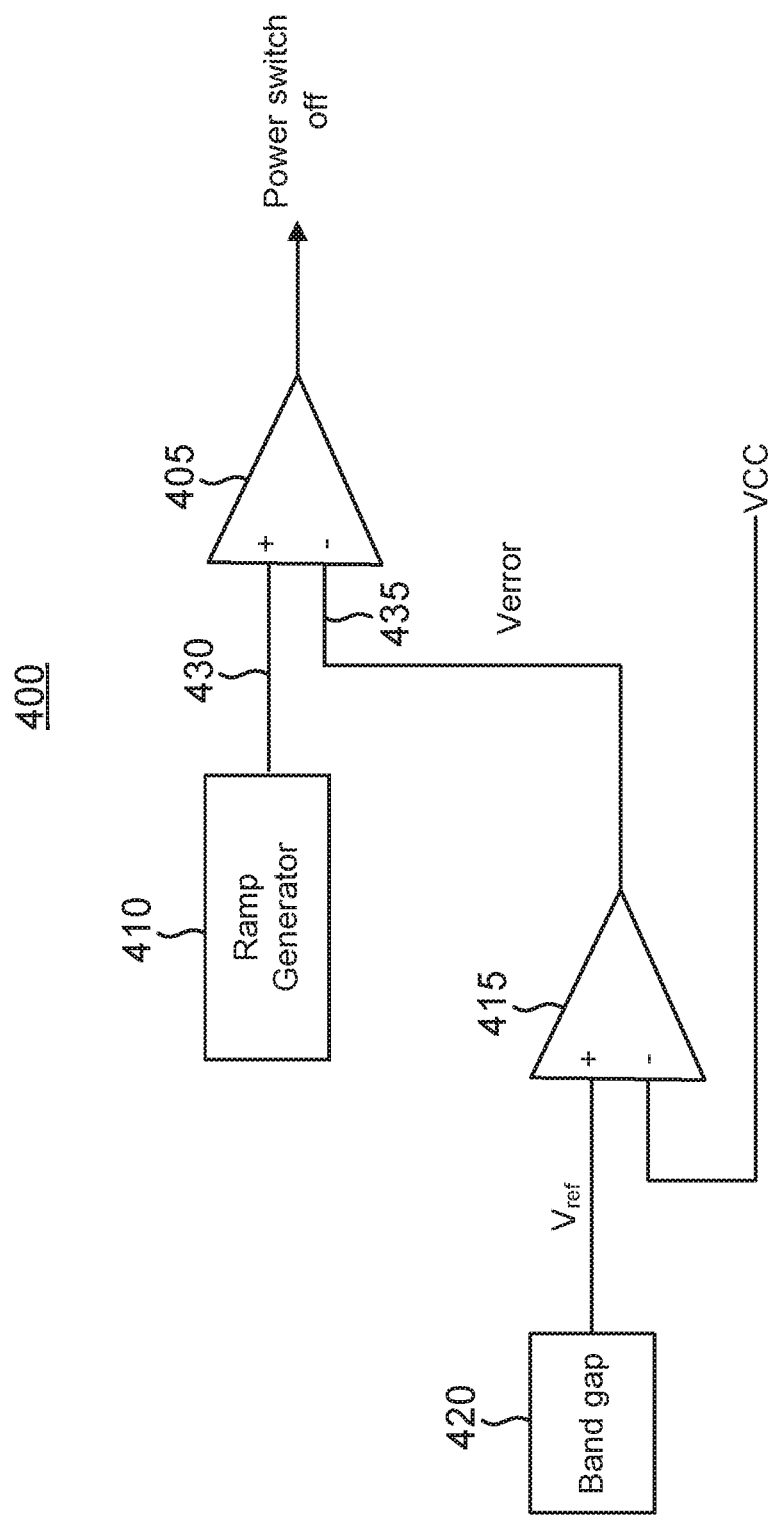
FIG. 4 is a block diagram of a feedback control circuit for controlling the cycling of a VCC charging switch transistor according to a constant on time control methodology.

In an alternative approach, a constant on-time control methodology may be practiced as shown for a feedback circuit 400 of FIG. 4. A differential amplifier 415 compares a stable reference voltage such as derived from a band gap reference circuit 420 to VCC to generate an error voltage Verror. A compensation filter (not illustrated) may compensate Verror to create a compensated error signal 435. A comparator 405 compares compensated error signal 435 to a ramp signal 430 from a ramp generator 410 to cycle off the VCC charging switch transistor Q2 when ramp signal 430 exceeds compensated error signal 435. Ramp generator 410 may be triggered by a clock (not illustrated) that controls the power switch cycling period such that the start of each ramp in ramp signal 430 is synchronous with the start of a switching period for power switch transistor cycle Q1. It will be appreciated that other control methodologies besides peak constant current or constant on-time may be used to regulate the controller power supply voltage VCC.

Figure 5:
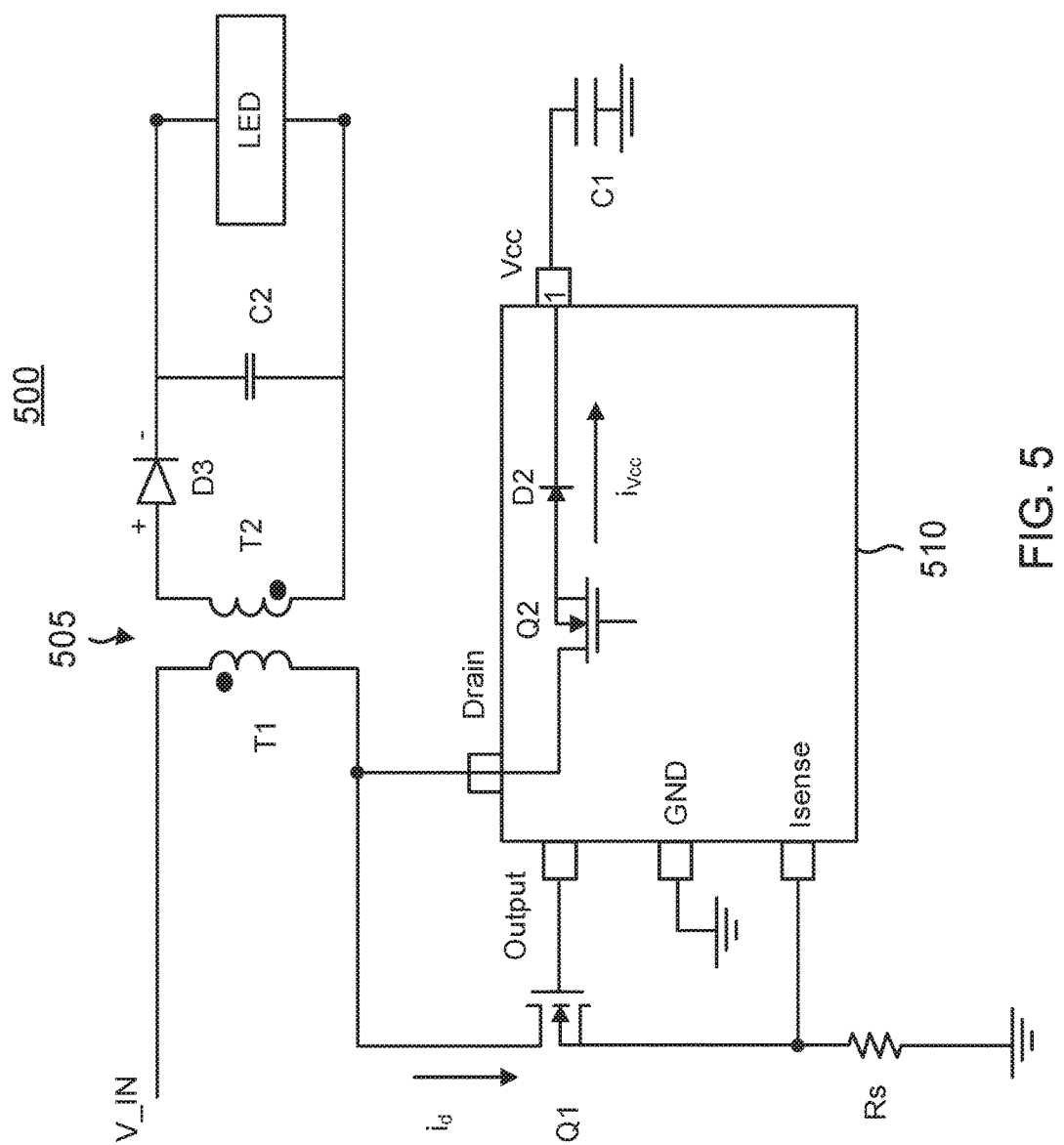
FIG. 5 is a circuit diagram of an isolated switching power converter configured for efficient VCC charging in accordance with an aspect of the disclosure.

As discussed above, the efficient VCC charging disclosed herein may also be practiced in an isolated switching power converter such as a flyback converter 500 shown in FIG. 5. A transformer 505 includes a primary winding T1 and a secondary winding T2. Primary winding T1 is driven by an input voltage V_IN such as obtained from the rectification of an AC mains to conduct a magnetizing current when a controller 510 cycles on power switch transistor Q1. Secondary winding T2 couples through a diode D3 to an output capacitor C2 and a load such as a light emitting diode (LED). As discussed analogously with regard to controller 120 of FIG. 1, controller 510 includes a drain terminal coupled to the drain of power switch transistor Q1 and also a VCC terminal coupled to the VCC storage capacitor C1. An optoisolator (not illustrated) coupled between the input and output sides of transformer 505 provides feedback on the power delivery to the LED so that controller 510 may modulate the cycling of power switch transistor Q1 accordingly. Transformer 505 needs no auxiliary winding despite the efficient charging of the VCC power supply voltage, which advantageously lowers costs for flyback converter 500.

Figure 6:
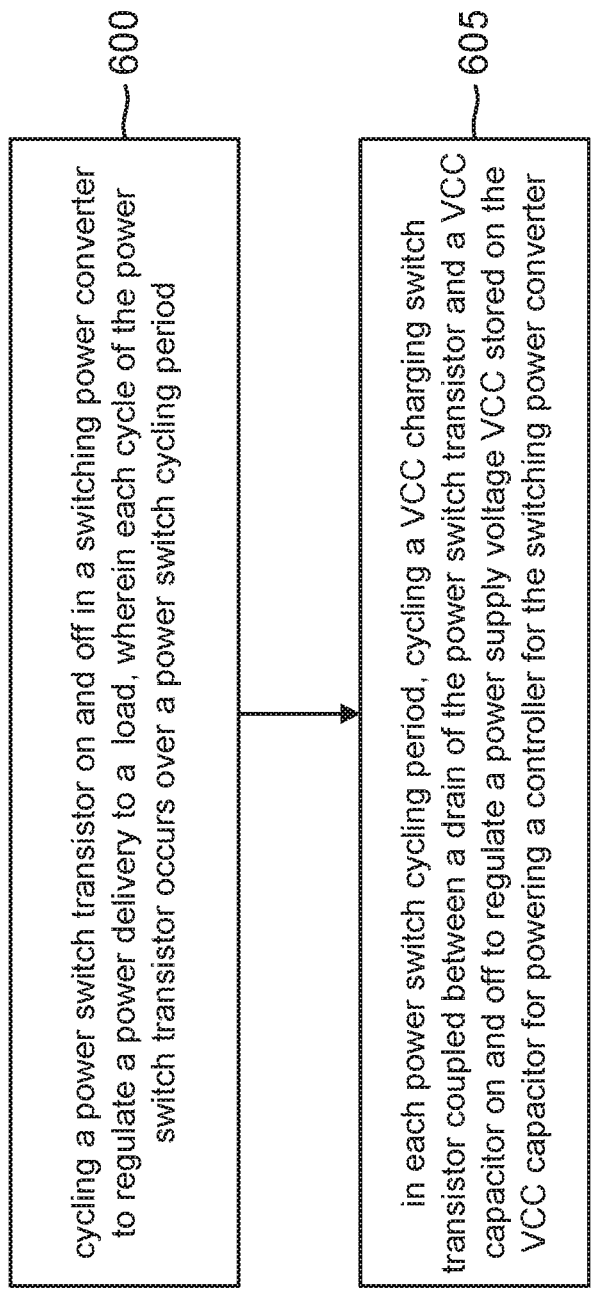
FIG. 6 is a flowchart for a method of efficiently generating a controller power supply voltage VCC in accordance with an aspect of the disclosure.

A method of operation for an efficient VCC charging technique will now be discussed with regard to the flowchart of FIG. 6. The method includes an act 600 of cycling a power switch transistor on and off in a switching power converter to regulate a power delivery to a load, wherein each cycle of the power switch transistor occurs over a power switch cycling period. The cycling of power switch transistor Q1 as discussed with regard to switching power converters 100 and 500 is an example of act 600.

The method also includes an act 605 of, in each power switch cycling period, cycling a VCC charging switch transistor on and off to regulate a controller power supply voltage VCC stored on a VCC storage capacitor for powering a controller for the switching power converter, wherein the VCC charging switch transistor is coupled between the drain of the power switch transistor and the VCC storage capacitor. The cycling of VCC charging switch transistor Q2 as discussed with regard to switching power converters 100 and 500 is an example of act 605.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A switching power supply controller; comprising:
   a drain terminal configured to connect to a drain of an NMOS power switch transistor;
   a VCC capacitor terminal configured to connect to a VCC capacitor;
   a VCC charging switch transistor coupled between the drain terminal and the VCC capacitor terminal, wherein the VCC charging switch transistor is a depletion-mode field effect transistor (DFET);
   a diode having an anode coupled to the VCC charging switch transistor and a cathode coupled to the VCC capacitor terminal; and
   a feedback control circuit configured to modulate a cycling of the VCC charging switch transistor to regulate a controller power supply voltage VCC stored across the VCC capacitor, wherein the feedback control circuit is configured to switch off the VCC charging switch transistor in each cycle of the VCC charging switch transistor responsive to a charging current conducted by the VCC charging switch transistor equaling a desired peak current, and wherein the feedback control circuit comprises a differential amplifier configured to generate an error voltage responsive to a comparison of the controller power supply voltage VCC to a reference voltage and further comprises a compensation filter configured to filter the error voltage to generate a compensated error voltage that forms a peak current command voltage representative of the desired peak current.

2. The switching power supply controller of claim 1, wherein the feedback control circuit further comprises a comparator configured to switch off the VCC charging switch transistor in each cycle of the VCC charging switch transistor responsive to a comparison of a sense voltage representative of the charging current to the peak current command voltage.

3. The switching power supply controller of claim 1, wherein the feedback control circuit is configured to switch off the VCC charging switch transistor to maintain a constant on time for the VCC charging switch transistor in each cycle for the VCC charging switch transistor.

4. The switching power supply controller of claim 3, wherein the feedback control circuit includes a ramp generator configured to ramp a ramp signal during each cycle of the VCC charging switch transistor.

5. The switching power supply controller of claim 4, wherein the feedback control circuit further comprises a comparator configured to switch off the VCC charging switch transistor in each cycle of the VCC charging switch transistor responsive to a comparison of the ramp signal to a compensated error signal.

6. The switching power supply controller of claim 5, wherein the switching power supply controller is included within a non-isolated switching power converter.

7. The switching power supply controller of claim 5, wherein the switching power supply controller is included within an isolated switching power converter.

8. The switching power supply controller of claim 7, wherein the isolated switching power converter comprises a flyback converter.

9. A method, comprising:
cycling an NMOS power switch transistor on and off in a switching power converter to regulate a power delivery to a load, wherein each cycle of the NMOS power switch transistor occurs over a power switch cycling period;
in each power switch cycling period, cycling a VCC charging switch transistor on and off to regulate a controller power supply voltage VCC stored on a VCC storage capacitor for powering a controller for the switching power converter, wherein the VCC charging switch transistor is connected between a drain of the NMOS power switch transistor and the VCC storage capacitor;
determining an error voltage by comparing the controller power supply voltage VCC to a reference voltage; and
determining a desired peak current for the VCC charging switch transistor responsive to the error voltage, wherein cycling the VCC charging switch transistor comprises switching off the VCC charging switch transistor in each power switch cycling period responsive to a current conducted by the VCC charging switch transistor equaling the desired peak current.

10. The method of claim 9, wherein cycling the NMOS power switch transistor on and off in the switching power converter comprises cycling an NMOS power switch transistor in an isolated switching power converter.

11. The method of claim 9, wherein cycling the NMOS power switch transistor on and off in the switching power converter comprises cycling an NMOS power switch transistor in a non-isolated switching power converter.

12. The method of claim 9, further comprising:
generating a ramp signal;
comparing the ramp signal to the error voltage in each cycle of the VCC charging switch transistor; and
wherein cycling the VCC charging switch transistor off in each cycle of the VCC charging switch transistor is further responsive to a comparison of the ramp signal to the error signal.

13. The method of claim 12, further comprising generating the reference voltage in a band gap reference circuit.

* * * * *